2,849,318
Patented Aug. 26, 1958

2,849,318

METHOD OF PREPARING DISPERSIONS OF VEGETAL PHOSPHATIDE FRACTIONS

Percy L. Julian, Oak Park, and Herbert T. Iveson, Elmhurst, Ill., assignors to The Glidden Company, Cleveland, Ohio, a corporation of Ohio No Drawing. Application June 21, 1951
Serial No. 232,868

3 Claims. (Cl. 99—15)

This invention relates to novel compositions of matter comprising a fraction of vegetal phosphatides classified on the basis of the solubility of the fraction in alcohol. More particularly, it relates to such compositions comprising phosphatides derived from soybeans and especially relates to those compositions which comprise an oil carrier for each of the separate phosphatide fractions.

It is well known that the mixtures of phosphatides derived from vegetal sources, particularly from soybeans, corn and peanuts, and commonly called "lecithin," are effective as emulsifiers in a wide variety of mixtures of two or more fluids capable of being emulsified. The so-called "lecithin" of commerce is in reality a complex mixture of phosphatides, containing in addition to the chemical entity lecithin, such other materials as cephalin, inositol phosphatides, carbohydrates and others. Its composition varies somewhat depending upon the vegetal source and the processing steps used to isolate the crude lecithin. Past experience with crude lecithin has indicated that in a number of use applications the emulsifying ability of the lecithin leaves much to be desired. Although the use of supplementary interface modifiers overcomes this lack of effectiveness of crude lecithin more or less successfully, improvements in crude lecithin have long been sought.

We have now found that there is present in the crude lecithins derived from a vegetal source substances capable of stabilizing a water-in-oil emulsion, and other substances capable of stabilizing an oil-in-water emulsion. Both types of surface-active materials being present in an intimate mixture in the crude "lecithin" accordingly may oppose each other in specific instances. For example, when preparing an oil-in-water type emulsion, it is believed that one portion of the crude "lecithin" tends to stabilize such emulsions while the presence therein of the other constituents of the crude "lecithin" acts to break the emulsion. The net result, therefore, is a relatively unstable emulsion. Conversely, when attempting to prepare a water-in-oil emulsion using crude "lecithin," a portion thereof may render the said emulsion less stable.

Accordingly, it is an object of the present invention to provide improved emulsifying compositions comprising isolated vegetal phosphatide fractions in carriers.

It is a further object of this invention to provide a process for separating the antagonistic portions of vegetal phosphatides, and for dispersing the separate fractions in carriers.

A further object is to provide an alcohol-insoluble moiety of vegetal phosphatides stabilized against oxidative deterioration.

These and other objects of the invention will be evident to those skilled in the art from the following description.

In accordance with the present invention, the crude lecithin is separated into two fractions or moieties by extraction of the whole with an hydroxylated aliphatic solvent; for example, methanol, ethanol, isopropanol or mixtures thereof. By this treatment we have obtained an alcohol-soluble moiety and an alcohol-insoluble moiety. Substantially equal amounts of each are usually obtained. The alcohol-soluble moiety is believed to contain substantially all of the chemical entity known as lecithin which is present in the crude phosphatide mixture, and has been found to be effective as an emulsifier for the oil-in-water type of emulsion as exemplified by mayonnaise, oil sprays, some types of emulsion paints, and baked goods, such as cake and bread. The alcohol-insoluble moiety is believed to contain inositol phosphatide, cephalin, carbohydrates and other materials and is effective as an emulsifier for the water-in-oil type of emulsion as illustrated by margarine, certain emulsion coating compositions, and lubricating oil compositions.

The crude lecithin is usually obtained, together with oily constituents, by extraction of vegetal material with a hydrocarbon solvent. After removal of the solvent, the crude lecithin is separated from the oily portion of the residue by passing superheated steam into the residue thereby hydrating the phosphatide fraction and causing it to become insoluble in the oil. The hydrated crude lecithin is then recovered from the oil by suitable means, e. g., by centrifuging. Entrained oil is preferably removed from the hydrated crude lecithin by washing with acetone, e. g., as described in United States Patent 1,895,-424, thereby also effecting a purification of a sort.

The oil-freed crude lecithin thus obtained, although lighter in color, is still a complex mixture comprising constituents having antagonistic emulsifying effects as alluded to hereinabove, and accordingly in a state which is unsuitable for many applications in which efficient emulsifying action is desired. For example, this crude lecithin has been extensively used as an interface modifier in margarine. As normally produced in commerce, margarine is essentially an emulsion of water-in-oil. Under normal frying conditions, the margarine tends to separate into two layers since heat breaks the emulsion. The water phase, being heavier than the oil phase, collects underneath the oil and becomes superheated. This causes the water to burst out of its oily enclosure with explosive violence giving rise to the phenomenon commonly known as spattering. Attempts to overcome this and other deficiencies due to emulsion instability with crude lecithin have not been successful. The amounts of this agent which can be used are limited from practical considerations since the crude lecithin imparts a distinctive taste and aroma to the margarine. These characteristics being different from those of butter are undesirable. In contrast thereto, it has been found that 0.1% of the alcohol-insoluble moiety of crude lecithin uniformly dispersed in margarine will substantially eliminate spattering, while 0.3% of the crude lecithin (an amount more than sufficient to impart an undesirable distinctive flavor and aroma) is required in the same margarine to secure a comparable result. Since the alcohol-insoluble moiety constitutes roughly half of the crude lecithin, it will be seen that about 0.15% of the alcohol-insoluble moiety is required when the alcorol-insoluble moiety is present also, whereas only 0.1% of the alcohol-insoluble moiety is required in the absence of the antagonistic moiety. Thus the presence of the alcohol-soluble moiety reduces the effectiveness of the insoluble moiety by about 33%. In other words, only two-thirds as much of the insoluble moiety is needed when the margarine is substantially free of the alcohol-soluble moiety.

In an analogous manner, it has been found that the use of the alcohol-soluble moiety as the emulsification agent in oil-in-water emulsions is surprisingly more effective than the same amount of said moiety when admixed with the antagonistic alcohol-insoluble moiety; that is, when an amount of crude lecithin containing an equivalent amount of the alcohol-soluble moiety is used. Example 6 illustrates this discovery.

In the preferred manner of carrying out the process of our invention, the phosphatides obtained, e. g., by the solvent extraction of soybeans, separation in hydrated form from the solvent-freed extract by centrifuging, dehydration in vacuum (during which the crude lecithin may be bleached to improve its color), are washed with acetone to remove entrained oil. The acetone is removed substantially completely at a low temperature, i. e., below 75° C. and under vacuum.

The oil-freed crude lecithin then is extracted with alcohol and the resultant solution of the alcohol-soluble moiety is separated from the insoluble moiety by any convenient means, e. g., filtration, centrifuging or decantation. The solvent is then removed by vacuum distillation at a temperature below 75° C. and preferably below 60° C.

The resultant products are obtained as lightly colored, waxy solids of indeterminate melting points. Because of their low softening points, the storage, transportation and use of these products in the dried state presents a troublesome problem. Additionally, these products, and especially the alcohol-soluble moiety, are somewhat hygroscopic, which adds to the difficulties of handling in humid climates. Further, in the dried state the phosphatide moieties are rather difficult to disperse in the compositions wherein said products are advantageously used. This last difficulty is especially bothersome since it reduces consumer acceptance.

These problems have been solved, in accordance with the present invention, by dissolving or dispersing the individual moieties of crude lecithin in suitable carriers or mixtures of carriers; for example, a vegetal oil carrier such as refined coconut oil, peanut oil, hydrogenated cottonseed oil, hydroxylated soya oil, mixtures of mono- and di-glycerides, cocoabutter, and the like, or an animal oil such as lard, or an organic solvent such as propylene glycol, diethylene glycol ethyl ether, terpenes, turpentine, or a petroleum fraction boiling above about 150° C. such as kerosene, lubricating oil and the like. These compositions of a moiety of crude lecithin dispersed in a carrier are stable dispersions and are more readily incorporated in a wide variety of emulsifiable mixtures than the solid moieties. The choice of the carrier depends firstly upon the solubility, compatibility, or dispersibility of the particular moiety therein, and secondly upon the specific end use to which the resultant composition is to be applied.

While carrier dispersions of either moiety in any desired low concentration can be prepared by simply admixing and stirring the isolated, alcohol-free moiety with the carrier, we have found that it is commonly very difficult to make dispersions having a concentration over about 50% unless the carrier is admixed with the isolated moiety while the latter is still wet with the hydroxylated aliphatic solvent employed in separating the moieties one from the other. The re-dispersibility of the moieties seems to be greatly impaired by freeing them of the hydroxylated solvent. By dispersing them in carriers while still wet with the solvent, concentrations of as high as 80% or more may be prepared readily. The concentrated dispersions not only are advantageous in overcoming the storage, handling and transportation difficulties mentioned above, but are also very advantageous because, as we have discovered, the higher concentrations are unexpectedly more stable dispersions than those of concentrations below about 50%, and in some instances are more fluid. We especially prefer to prepare dispersions having concentrations around 70%.

The following examples will illustrate the principles of our invention:

Example 1

Forty pounds of oil-free phosphatides (crude lecithin) were extracted with 10 gallons of specially denatured alcohol (SDA No. 3A) for 4 hours. The solvent was decanted from the insoluble residue. The latter was extracted with a similar quantity of alcohol for a like period eight times thereafter, decanting the solvent after each extraction.

The alcoholic extracts were combined and evaporated to dryness, removing the final portion of the solvent in vacuo. Thusly, 18 pounds of the alcohol-soluble moiety were obtained.

The alcohol-insoluble material was filtered and to the filter cake an acetone solution of α-tocopherol (sufficient to admix 0.1% by weight of α-tocopherol with the mixture) was added and blended thereto as uniformly as possible. The resultant mixture was dried at 150° F. and under atmospheric pressure. 22 pounds of the alcohol-insoluble moiety containing 0.1% to α-tocopherol were obtained.

This product exhibits greatly increased oxidative stability and improved anti-oxidant properties. Like synergistic effects may be secured with amounts of tocopherols from about 0.05% to 1%. Preferably from 0.1% to 0.3% is used. The use of such stable mixtures is desirable in many instances—for example, when the product is to be used in the presence of fatty materials, the development of distinctive odors and tastes due to rancidity is markedly diminished. Further, the phosphatides derived from vegetal sources have been suggested for use in compositions designed for intravenous feeding (Dietrich, Southern Medical Journal 43, 143–145 (1950)). The products of oxidation of the phosphatides are believed to consist in part of peroxides which, as is known, give rise to pyrogenic reactions. The presence in the phosphatides of tocopherol substances prevents to a large degree the development of pyrogens in such intravenous compositions.

The following example illustrates the protective synergistic property of the novel compositions:

Ten grams of substantially oil-free, alcohol-insoluble moiety were blended with 0.01 gram of mixed tocopherols dissolved in acetone. The mixture was vacuum dried and the product compared for stability (i. e. development of rancidity) with the alcohol-insoluble moiety free of tocopherol.

|  | Storage condition | Keeping time, days |
|---|---|---|
| Alcohol-insoluble moiety | Open to air and in light | 5 |
|  | In closed container | 31 |
| Alcohol-insoluble moiety plus tocopherol (0.1%) | Open to air and in light | 19 |
|  | In closed container | 178 |

Example 2

Five hundred pounds of crude lecithin were washed in a Baker-Perkins machine with approximately 150 gallons of acetone. This washing procedure was repeated eight times. The oil-free crude lecithin was then agitated with 100 gallons of SDA No. 23A alcohol for 15 minutes. After settling the slurry, the alcohol was decanted from the solid residue. This extraction process was repeated five times.

The alcoholic extracts were evaporated by distillation under vacuum to a viscous syrup and 45 pounds of cocoabutter added thereto. The resultant mixture was evaporated to dryness (i. e., the residual alcohol removed) in vacuo. The yield of alcohol-soluble moiety dispersed in cocoabutter was 195 pounds.

To the solvent-wet, insoluble portion of the extracted crude lecithin, 80 pounds of margarine oil (a mixture consisitng of 70% hydrogenated cottonseed oil and 30% hydrogenated soya oil) was added. The mixture was heated under vacuum to remove the residual solvent. 350 pounds of the alcohol-insoluble moiety dispersed in margarine oil was obtained.

Example 3

One part of oil-free crude lecithin was extracted at about 20° C. with 1 part of 99% isopropyl alcohol for ½ hour. The solvent was decanted from the lecithin residue, which then was extracted 10 times additionally with similar quantities of isopropyl alcohol..

The alcoholic extracts were evaporated to dryness under partial vacuum, removing the final traces of solvent in a vacuum oven. 35% of the original crude lecithin was obtained as the alcohol-soluble moiety.

The residue from the extraction was filtered and dried. The dried material represented 65% of the original crude lecithin.

Example 4

Five hundred twenty-eight grams of oil-free crude lecithin were extracted at about 20° C. with an equal weight of anhydrous ethanol for 8 hours. The solvent was decanted from the insoluble residue. The latter was extracted nine additional times. The alcoholic extracts were evaporated to dryness (as in the preceding examples) and the residue obtained weighed 276 grams.

The alcohol-insoluble portion was filtered and washed twice with acetone. After being dried, the residue weighed 252 grams.

In a similar manner, 503 grams of oil-free phosphatides were separated by anhydrous methyl alcohol extraction into an alcohol-soluble moiety (74%) and an alcohol-insoluble moiety (26%).

Example 5

The use of crude lecithin-cocoabutter mixtures as a means of reducing the viscosity of chocolate coating preparations is well known in the art. The crude lecithin is believed to act by reducing the interfacial tension of the individual chocolate particles in the liquor and thereby to reduce the viscosity of the chocolate composition. The prime purposes for such mixtures are ease of handling, application of thinner coatings and production of smoother coatings. Present practice involves the use of an oil-free crude lecithin-cocoabutter mixture containing about 75% of the crude lecithin. The addition of 0.3% of such a mixture to chocolate results in a maximum reduction of the viscosity thereof to 53% of the viscosity of the chocolate.

A mixture of the alcohol-soluble moiety of crude lecithin and cocoabutter was prepared substantially as described in Example 2, using sufficient cocoabutter to result in a concentration of the alcohol-soluble moiety in the mixture of 65%. A chocolate composition containing 0.15% of this mixture gave a reduction in viscosity equivalent to that obtained when using 0.3% of the crude lecithin-cocoabutter mixture. Use of 0.3% of the new mixture in chocolate coating gave a viscosity reduction to 44% of the original chocolate viscosity.

A similar preparation containing 69% of the alcohol-soluble moiety dispersed in "hard butter" (a hydrogenated vegetable oil) gave a viscosity reduction to 53% when used in a concentration of 0.15% and to 47% when used in a concentration of 0.30%. The copending application Serial No. 335,998, filed February 9, 1953, describes and claims a chocolate product modified with small amounts of the alcohol-soluble moiety of vegetal phosphatides.

Example 6

In the art of cake baking, it is known that the ratio of sugar to flour used largely determines the moisture retention, sweetness and tenderness of the product. Accordingly, a sugar/flour ratio as high as possible is desirable. However, as this ratio approaches or exceeds unity, the finished cake tends to become smaller in volume (i. e., is more prone to "fall") and is heavier in texture. This tendency of high sugar/flour ratio cakes to "fall" has been overcome by the use of relatively large proportions of expensive emulsifiers, which are believed to supplement the ability of the flour to stabilize the emulsion of the shortening and water.

In the preparation of a cake having a sugar-to-flour ratio of 1.35:1, the use of 4% Promofat (a product of Procter & Gamble being a mixture of mono- and diglycerides) as the emulsifier results in a cake volume of 1380 cc./pound.

A similar cake was prepared in which the Promofat was replaced by 2% of a mixture containing 20% crude lecithin dispersed in 80% hydrogenated soybean oil. The resultant cake volume was 1325 cc./pound.

A third cake was prepared in analogous fashion in 1½% of a mixture of 20% of the alcohol-soluble moiety of crude lecithin dispersed in 80% of hydroxylated soybean oil was used as the emulsifier. The resultant cake had a volume of 1385 cc./pound, which cake was equal to or superior to the first cake in moisture retention, tenderness, texture, flavor and general appearance.

A fourth cake was prepared using 2% of a mixture of 20% of the alcohol-soluble moiety and 80% of Promofat. The resultant cake had a volume of 1370 cc./pound.

An emulsifier particularly adapted for use in baked goods and high ratio cakes and composed of about 20 parts of the alcohol-soluble moiety of vegetal phosphatides dispersed in about 80 parts of hydroxylated soya bean oil is described and claimed in the copending application of Julian, Iveson and Radlove, Serial No. 291,974, filed June 5, 1952, now Patent No. 2,773,771.

Example 7

Lubrication of marine engine parts, such as propeller shafts, is complicated somewhat by the presence of water and moisture. The efficiency of the oils used is improved by the presence therein of an emulsifier which by the ability of the oil to retain water in suspension enables the lubricant to continue its function. Many such agents do not form emulsions which adhere to the parts being lubricated. Thus, when the limit of the emulsifying power is reached, the emulsion formed is readily washed from the moving parts by the excessive water and/or moisture. In this class, crude lecithin can be placed. 20 ml. of a 4% solution of crude lecithin dispersed in a No. 72 viscosity lubricating oil (Shell) emulsified 25 ml. of water.

On the other hand, 20 ml. of a lubricating oil containing 4% of a mixture of 70% of the alcohol-insoluble moiety of crude lecithin dispersed in 30% of the same lubricating oil emulsified 55 ml. of water.

The emulsion formed with the alcohol-insoluble moiety more readily adhered to a smooth metallic surface than the emulsion stabilized with crude lecithin, as evidenced by the following test. A smooth copper paddle was rotated for several minutes in the emulsion at the point at which no more moisture will be taken up. Thereafter the paddle was removed from the emulsion and permitted to drain. After several minutes, the paddle wetted with the emulsion stabilized with crude lecithin had drained substantially clean whereas the paddle wetted with the emulsion stabilized with the alcohol-insoluble moiety was still coated with a continuous heavy film of the emulsion. This tenacious behavior of the lubricating emulsion composition continued even after the oil had been mixed with 3 to 4 times its weight of water.

As has been indicated in the above examples, the constituents of the crude lecithin are separated into two approximately equal fractions or moieties by alcohol extraction. The solubility of the constituents of the crude lecithin is different in different alcohols or mixtures thereof. For example, extraction with ethanol gives 52% of the alcohol-soluble moiety and 48% of the alcohol-insoluble moiety. Extraction of the same crude lecithin with methanol results in 74% of the alcohol-soluble moiety and 26% of the alcohol-insoluble moiety. It is evident from this that the products obtained by use of different alcohols may vary in composition and efficiency as emulsifying agents. However, our invention, in its broader concept, includes all such products derived by extraction of crude lecithin from a vegetal source with a hydroxylated, aliphatic, organic solvent of the type disclosed herein.

This invention is not limited to the specific embodiments thereof illustrated in the above examples. Thus, various changes in the procedure of effecting the separation of the moieties of crude lecithin can be used. For example, the oil-containing product can be subjected to extraction which will result in an alcohol-soluble moiety containing the entrained oil. Further, the incorporation of a particular moiety into a carrier can be effected after complete removal of the alcoholic solvent.

Attention is directed to copending application of Julian, Iveson and McClelland, Serial No. 217,302, filed March 23, 1951, now Patent No. 2,724,649, disclosing and claiming margarine compositions comprising the alcohol-insoluble moiety of vegetal lecithin substantially free of the alcohol-soluble moiety of said lecithin.

Having described the invention, what we claim is:

1. The method of preparing separate concentrated dispersions in carriers of the alcohol-soluble moiety and the alcohol-insoluble moiety of crude vegetal phosphatides which comprises the steps of: extracting crude vegetal phosphatides with an aliphatic alcohol having up to 3 carbons and separating the crude material into an alcohol-soluble moiety and an alcohol-insoluble moiety; thereafter dispersing both separated moieties into separate carriers selected from the group consisting of organic solvents boiling above about 150° C. and glyceride oils while each moiety is still wet with the aliphatic alcohol employed in said extraction and separation, the weight of each moiety being such in relation to the weight of carrier employed that the moiety constitutes between 50% and 80% of the resulting dispersion by weight, and finally heating both dispersions to remove the aliphatic alcohol therefrom and to recover separate, homogeneous, stable, dispersions of the separated moieties.

2. The method as claimed in claim 1 wherein the weight of each moiety in relation to the weight of carrier employed is such that the moiety constitutes about 70% of the resulting dispersion by weight.

3. The method as claimed in claim 1 which includes the step of adding a small amount of $\alpha$-tocopherol to the dispersion of alcohol-insoluble moiety in selected carrier.

References Cited in the file of this patent

UNITED STATES PATENTS

| | | |
|---|---|---|
| 1,667,767 | Bollman | May 1, 1928 |
| 1,673,615 | Bollman | June 12, 1928 |
| 1,895,424 | Rewald | Jan. 24, 1933 |
| 2,029,261 | Ginn | Jan. 28, 1936 |
| 2,276,317 | Kraybill | Mar. 17, 1942 |
| 2,432,698 | Taub | Dec. 16, 1947 |
| 2,464,927 | Hall | Mar. 22, 1949 |